US012641057B2

(12) United States Patent
Freed et al.

(10) Patent No.: US 12,641,057 B2
(45) Date of Patent: May 26, 2026

(54) AUTOMATED DETECTION AND CONFIGURATION OF PROTOCOLS AND PORTS FOR DEVICE ACCESS

(71) Applicant: Cisco Technology, Inc., San Jose, CA (US)

(72) Inventors: Michael Freed, Pleasanton, CA (US); Aaron Selesi, Simi Valley, CA (US); Sravanth Yajamanam, San Jose, CA (US); Ryan Holland, Pacifica, CA (US)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 18/231,443

(22) Filed: Aug. 8, 2023

(65) Prior Publication Data

US 2025/0055833 A1     Feb. 13, 2025

(51) Int. Cl.
H04L 9/40          (2022.01)
H04L 45/42         (2022.01)

(52) U.S. Cl.
CPC .......... H04L 63/0236 (2013.01); H04L 45/42 (2013.01); H04L 63/20 (2013.01)

(58) Field of Classification Search
CPC ...... H04L 63/0236; H04L 45/42; H04L 63/20
See application file for complete search history.

(56) References Cited

U.S. PATENT DOCUMENTS

| | | | |
|---|---|---|---|
| 6,560,660 B1 * | 5/2003 | Flanagin | G06F 9/526 717/109 |
| 10,397,143 B1 * | 8/2019 | Plenderleith | H04L 49/257 |
| 10,778,659 B2 | 9/2020 | Tola et al. | |
| 11,683,345 B2 * | 6/2023 | Keiser, Jr. | H04L 63/1433 726/1 |
| 2020/0067821 A1 * | 2/2020 | Sebastian | H04L 45/18 |
| 2021/0250332 A1 | 8/2021 | Moore et al. | |
| 2022/0038484 A1 * | 2/2022 | Das | H04L 63/10 |
| 2022/0200993 A1 | 6/2022 | Smith | |
| 2023/0115982 A1 | 4/2023 | Lin et al. | |
| 2023/0139329 A1 * | 5/2023 | Sivaswamy | H04L 63/20 726/15 |

OTHER PUBLICATIONS

"How to determine which program uses or blocks specific Transmission Control Protocol ports in Windows Server 2003", online: https://learn.microsoft.com/en-us/troubleshoot/windows-server/performance/determine-which-program-use-block-tcp-ports, Feb. 2023, 2 pages, Microsoft.
"Linux Find Out Which Process Is Listening Upon a Port", online: https://www.cyberciti.biz/faq/what-process-has-open-linux-port/, Apr. 2020, 26 pages, nixCraft.

* cited by examiner

*Primary Examiner* — Sm A Rahman
(74) *Attorney, Agent, or Firm* — Lee & Hayes, P.C.

(57)          ABSTRACT

In one embodiment, a method is disclosed comprising: measuring, by a process, a baseline of port and protocol usage of an accessing device while forwarding to a particular remote device is disabled; measuring, by the process, usage by an accessing application of specific ports and protocols while attempting to connect to the particular remote device while forwarding to the particular remote device is disabled; and causing, by the process, opening of the specific ports and protocols for operation of the accessing application with forwarding enabled to the particular remote device.

20 Claims, 6 Drawing Sheets

AUTOMATED DETECTION AND CONFIGURATION OF PROTOCOLS AND PORTS FOR DEVICE ACCESS

TECHNICAL FIELD

The present disclosure relates generally to computer networks, and, more particularly, to the automated detection and configuration of protocols and ports for device access, e.g., to IoT devices.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another, such as an IoT motion sensor communicating with a smart lightbulb, to turn the lights on when a person enters a room. The IoT has also expanded to industrial settings as part of the so-called "Industrial IoT" (IIoT) to control manufacturing processes and other operations in industrial settings (e.g., factories, mines, oil rigs, etc.).

As devices are increasingly added to the IoT and IIoT, the number of external users and services that require access to them has also increased. For instance, a remote technician may wish to connect to a particular IoT/IIoT device so that they can perform maintenance on it (e.g., updating its firmware, running diagnostics, etc.). However, the very nature of the IoT/IIoT presents unique challenges that make traditional remote access approaches largely unsuitable. Namely, the complexity involved in configuring access to these devices in a manner that preserves remote access connections frequently results in granting the devices overly broad network access rather than attempting to winnow down the access to only that which is necessary to operate. The result is exposure of unnecessarily large attack surfaces, increasing the chances of unauthorized access or exploitation by malicious actors.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
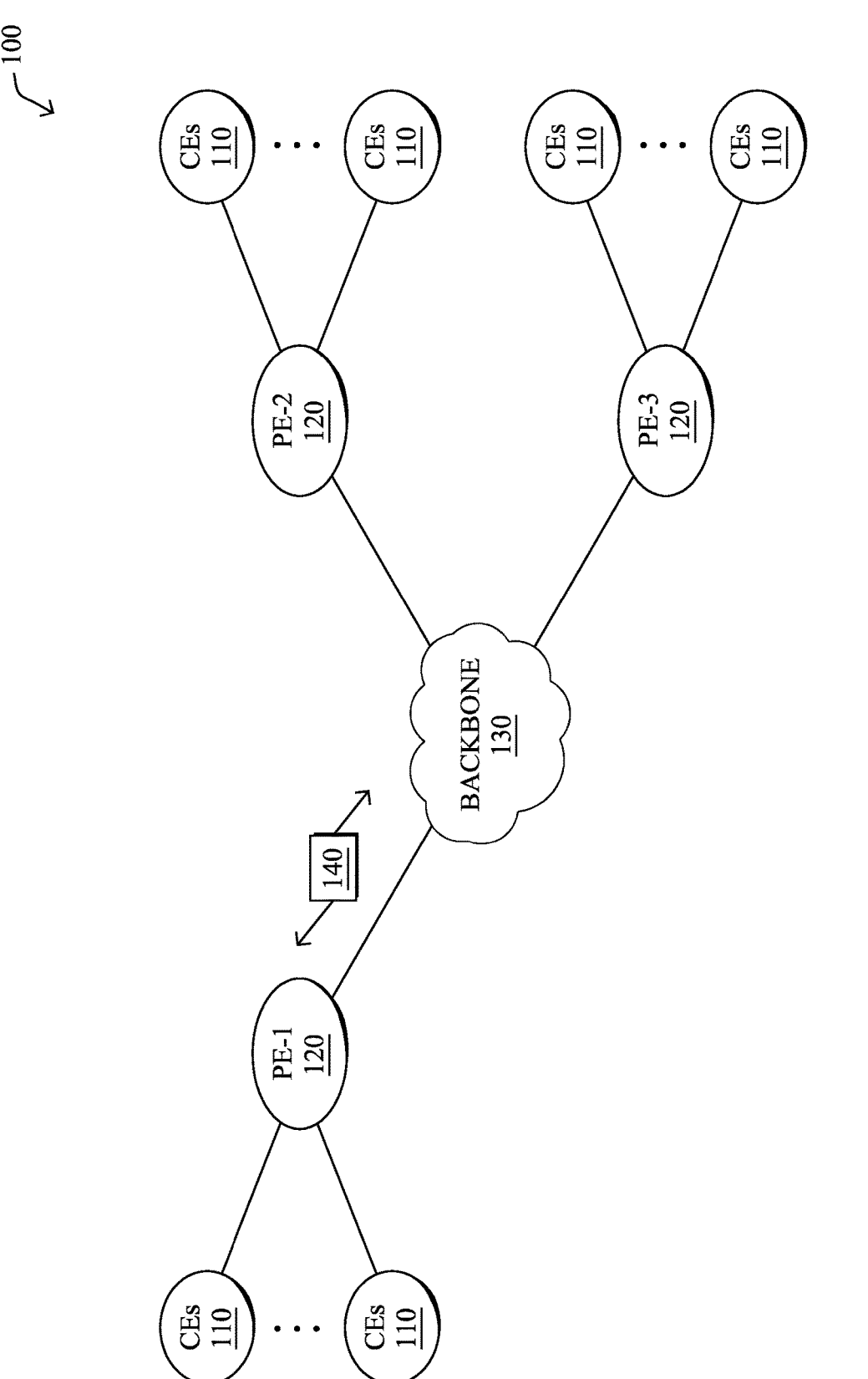
FIGS. 1A-1B illustrate an example communication network.

According to one or more embodiments of the disclosure, a method may include: measuring, by a process, a baseline of port and protocol usage of an accessing device while forwarding to a particular remote device is disabled; measuring, by the process, usage by an accessing application of specific ports and protocols while attempting to connect to the particular remote device while forwarding to the particular remote device is disabled; and causing, by the process, opening of the specific ports and protocols for operation of the accessing application with forwarding enabled to the particular remote device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network (e.g., network 100) illustratively comprising nodes/devices, such as a plurality of routers/devices interconnected by links or networks, as shown. For example, customer edge (CE) routers (e.g., CE routers 110) may be interconnected with provider edge (PE) routers (e.g., PE routers 120) (e.g., PE-1, PE-2, and PE-3) in order to communicate across a core network, such as an illustrative network backbone (network backbone 130). For example, routers (e.g., CE routers 110 and PE routers 120) may be interconnected by the public Internet, a multiprotocol label switching (MPLS) virtual private network (VPN), or the like. Data packets 140 (e.g., traffic/messages) may be exchanged among the nodes/devices of the computer network (e.g., network 100) over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 1B:
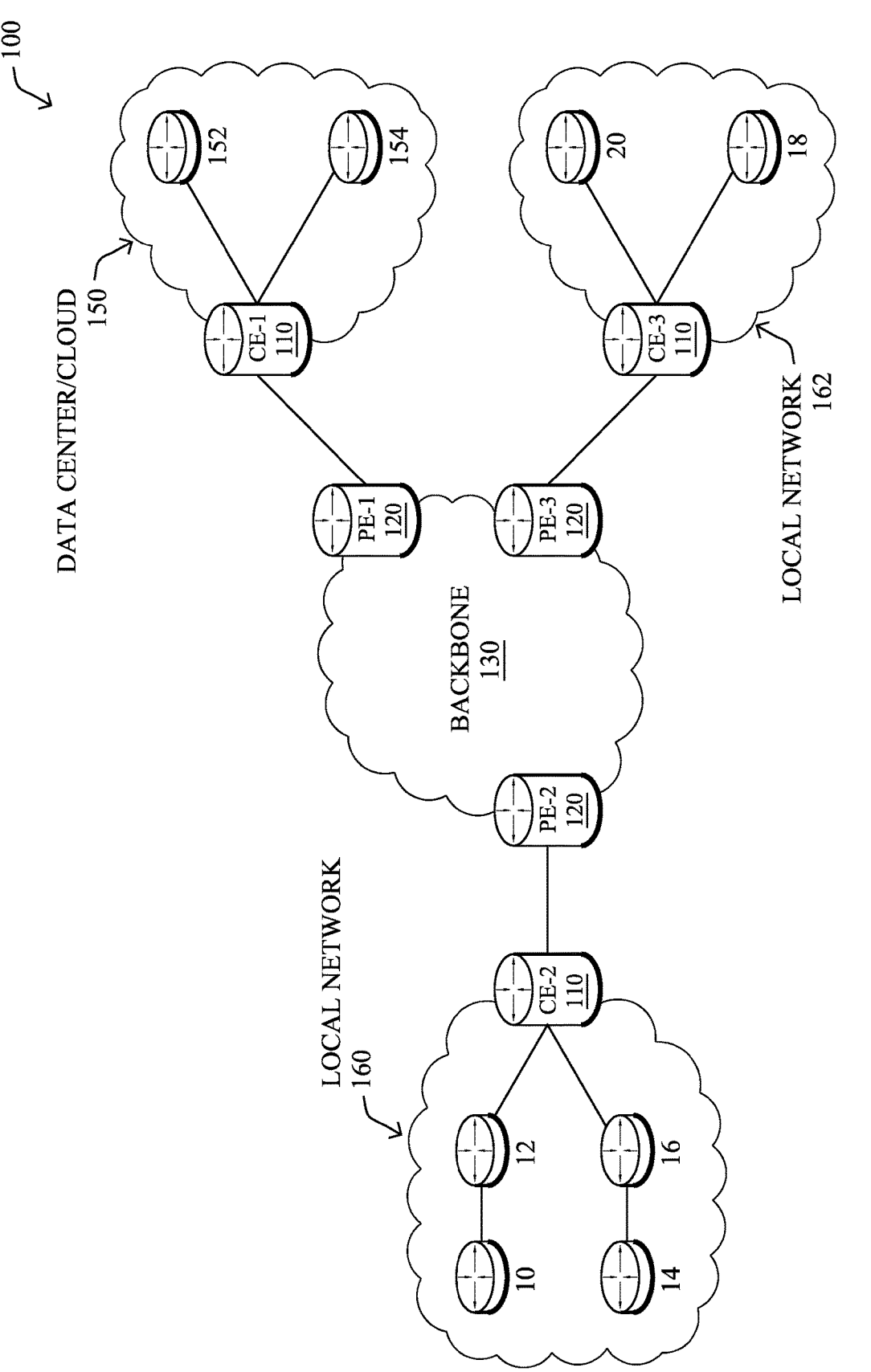

FIG. 1B illustrates an example of network 100 in greater detail, according to various embodiments. As shown, network backbone 130 may provide connectivity between devices located in different geographical areas and/or different types of local networks. For example, network 100 may comprise local/branch networks (e.g., local networks 160, 162) that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QOS), security, network management, and traffic engineering extremely challenging, to mention a few.

Figure 2:
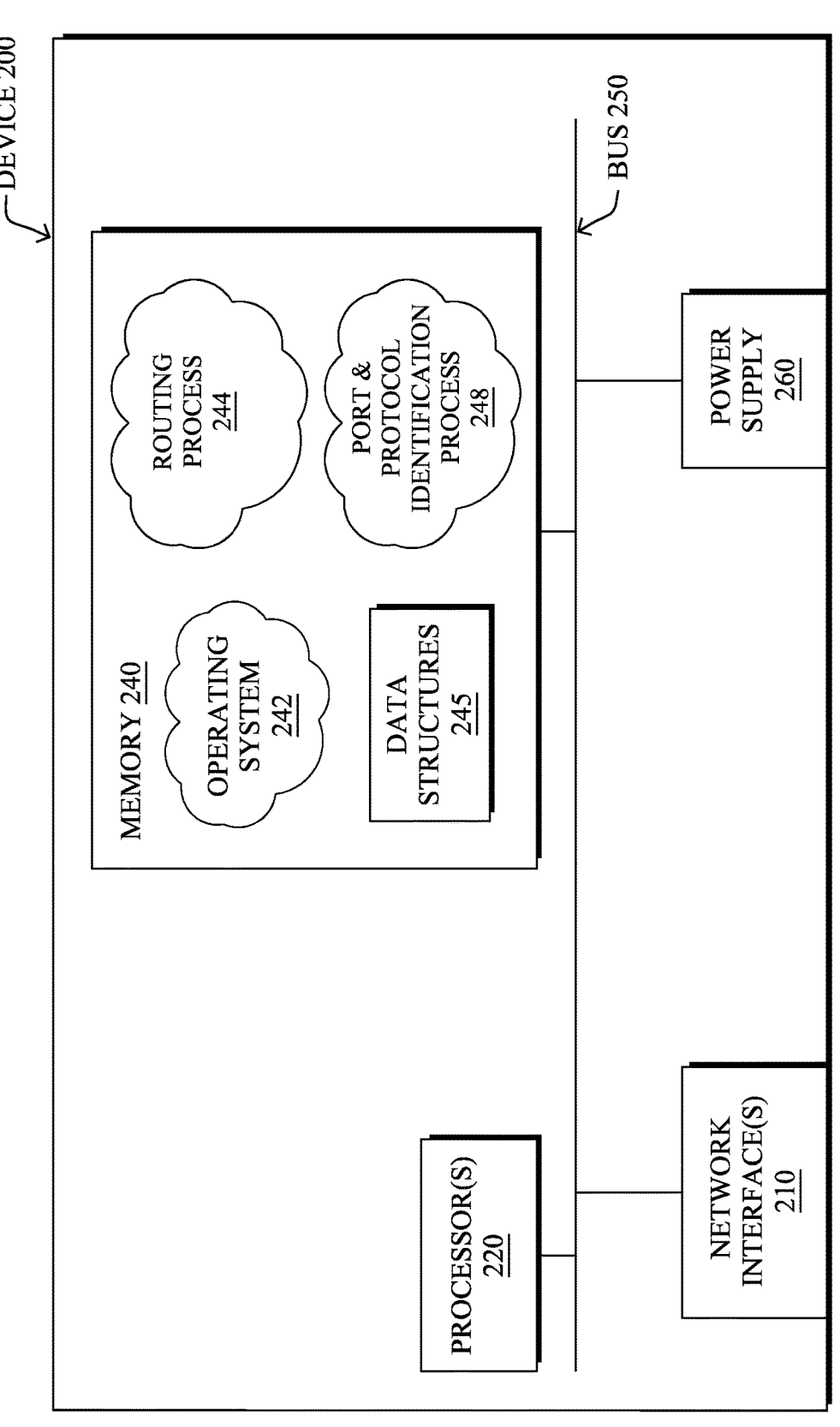
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces (e.g., network interface(s) 210), one or more processors (e.g., processor 220), and a memory 240 interconnected by a system bus 250, and is powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface(s) 210 may also be used to implement one or more virtual network interfaces, such as for virtual private network (VPN) access, known to those skilled in the art.

The memory 240 comprises a plurality of storage locations that are addressable by the processor(s) (e.g., processor 220) and the network interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a port and protocol identification process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services (e.g., routing process 244) include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers (e.g., device 200) using routing protocols, such as the conventional OSPF and IS-IS link-state protocols (e.g., to "converge" to an identical view of the network topology). Notably, routing process 244 may also perform functions related to virtual routing protocols, such as maintaining VRF instance, or tunneling protocols, such as for MPLS, generalized MPLS (GMPLS), etc., each as will be understood by those skilled in the art.

Port and protocol identification process 248 includes computer executable instructions that, when executed by processor(s) (e.g., processor 220), cause device 200 to perform automated learning of which ports and protocols are necessary for a certain IoT device (and application(s) associated with that device) within the network, as described in greater detail below.

In various embodiments, port and protocol identification process 248 may utilize machine learning techniques to learn which ports and protocols are actually needed for a certain IoT device (and application(s) associated with that device). In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of necessary port and protocol identification in a network, a learning machine may construct a model of port and protocol "noise" and/or port and protocol network behavior actually needed for a certain IoT device (and application(s) associated with that device), to detect data points (e.g., ports or protocols) that fit this model, deviate from this model, and/or are missing from this model. For example, a given model (e.g., a supervised, un-supervised, or semi-supervised model) may be used to generate and report port and protocol categorization scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of necessary port and protocol identification is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of necessary port and protocol identification. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, port and protocol identification process 248 may also use graph-based models for purposes of necessary port and protocol identification. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). Similarly patterns of port and protocol connections can be analyzed for purposes of necessary port and protocol identification.

——Detection and Configuration of Protocols and Ports for Device Access——

As noted above, the IoT/IIoT presents unique challenges that make traditional remote access approaches largely unsuitable. For example, if a technician wants to trouble-shoot one of these devices remotely, they will want to run commands on the device to determine what issues may be occurring before sending operational technology (OT) personnel to the location. In such instances, a remote access connection will be required. In addition, when a user wants a client application to access devices remotely, each device must have specific ports and protocols reachable for the client application to make a connection.

Unfortunately, configuring these devices in a manner that preserves necessary device access connections is operationally complex and presently occurs within a "black box" with respect to the necessity of any given port or protocol use with respect to a certain device, certain network conditions, certain applications, etc. Usually, traditional VPNs are not suitable for IoT/IIoT because they allow access to all ports and protocols on all devices, potentially creating unnecessarily large attack surfaces posing security risks.

Access control lists (ACLs) have been employed to limit which ports and protocols are open on a network. However, ACLs do nothing to alleviate the operational complexity and also fail to inform identification of which of those ports and protocols are necessary for a particular application and/or device. Existing remote access systems do not ameliorate any of these deficits.

Therefore, while users may be able to manually configure ACL lists, they are still doing so without an understanding of the exact requirements of devices and their applications. Users typically lack the knowledge to select the minimum ports and protocols necessary for connecting to their devices. In addition, they may have many different device types requiring different ports and protocols to be reachable and not have the knowledge of the software or devices to do so. Even if they were somehow able to obtain this knowledge, manually configuring ports and protocols in this manner is time consuming and error prone. Manual configuration primarily relies on guesses informed by extensive review of volumes of device documentation, which is not necessarily reflective of the actual operating conditions or configurations at a particular device/network.

Some operating system utilities attempt to match port usage to applications. These utilities are largely unworkable for the purpose of configuring IoT devices given the constrained resources typical of these devices. Further, while the aforementioned utilities can assist in identifying open ports on a device, they are not able to identify the minimum required subset of ports or protocols that are essential for the user application to operate correctly and securely on a given device.

Trial-and-error guesswork is currently relied upon in selecting specific ports and protocols for accessing devices. However, even the most thorough trial-and-error guesswork regularly fails to accurately identify the required ports and protocols to support access between an IoT device and an application. This failure manifests in unappreciated over inclusion of unnecessary ports and protocols and/or under inclusion of necessary ports and protocols that do not appear necessary during and initial trial-and-error guesswork period. Given the amount of effort involved in the trial-and-error approach and the subpar results that it yields, most users opt for a simpler approach of just allowing everything. In this approach, IoT devices are given access to all (e.g., unnecessary, necessary, etc.) ports and protocols on all devices since this approach necessarily preserves port and protocol access necessary for the remote access connections.

However, granting an IoT device overly broad network access can pose significant security risks. When an IoT device access involves more ports and protocols than necessary, it creates a larger attack surface by exposing more vulnerable ports and protocols and increases the chances of unauthorized access or exploitation by malicious actors. If compromised, this type of broad access could enable attackers to infiltrate the entire network, potentially leading to data breaches, unauthorized control of other connected devices, and disruption of critical systems.

In contrast, the techniques described herein introduce mechanisms for automated learning of protocols and ports needed to support access between a device (e.g., particularly an IoT device) and an application. Once learned, the information can be used to properly configure the network to support such access. Principally, these techniques may be utilized to automatically learn what is essential for a device's/application's intended functionality and limit its network access accordingly. Limiting network access to only what is essential for the intended functionality of a device and/or application may mitigate the risks of an oversized attack surface and enhance overall network security.

Figure 3:
FIG. 3 illustrates an example architecture for detection and configuration of protocol and ports for access to IoT devices.
Figure 3:
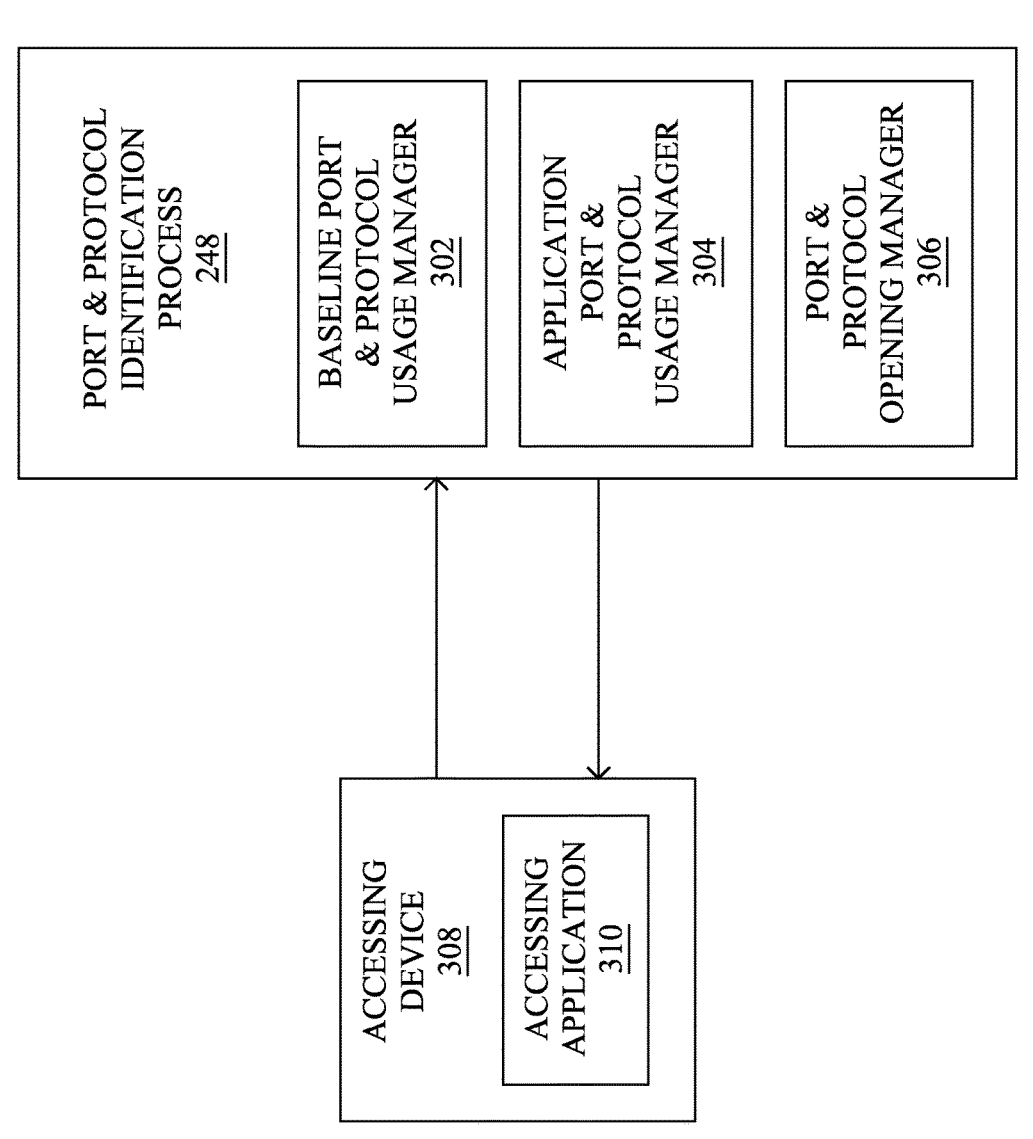

Specifically, and according to one or more embodiments of the disclosure, FIG. 3 illustrates an example architecture 300 for detection and configuration of protocol and ports for access to IoT devices. At the core of architecture 300 is port and protocol identification process 248, which may be executed at a data communications network edge node local to an IoT device, an edge device manager, a wireless access point, a network controller, an IoT hub, an IoT device, etc. In some examples, port and protocol identification process 248 may be a component of and/or communicatively integrated with a secure equipment access (SEA) utility which may be configured to remotely manage access and interact with both the network devices and connected clients. For example, the operations and/or data associated with port and protocol identification process 248 may be utilized as part of a utility for remote access that utilizes an SEA agent (e.g., executing at an edge device manager or controller) to directly access, troubleshoot, and/or monitor connected IoT clients in a deployment. As such, all or some of the operations associated with port and protocol identification process 248 may be carried out, partially or entirely, by an SEA agent, by an SEA cloud service, etc.

As shown, port and protocol identification process 248 may include baseline port and protocol usage manager 302, application port and protocol usage manager 304, and/or port and protocol opening manager 306. As would be appreciated, the functionalities of these components may be combined or omitted, as desired. In addition, these components may be implemented on a singular device or in a distributed manner, in which case the combination of executing device can be viewed as their own singular device for purposes of executing port and protocol identification process 248.

During execution, port and protocol identification process 248 may automatically learn which ports and protocols are actually needed for a certain remote device and/or an accessing application 310 associated with that remoted device. The accessing application 310 may be an application that is configured to remotely manage the particular remote device (e.g., a secure equipment access utility). The remote device may be an IoT device which may be under management of the accessing application 310. As such, port and protocol identification process 248 may facilitate a network administrator in efficiently configuring network policies that are neither too permissive, nor too restrictive with respect to the accessing application 310 and/or its communication with and/or management of an associated IoT device.

In various embodiments, baseline port and protocol usage manager 302 may be configured to measure a baseline or port and protocol usage of an accessing device 308 while forwarding to a particular remote device is disabled. For example, baseline port and protocol usage manager 302 may create a communication path or route (e.g., IP route) across which data packets may be communicated between accessing device 308 and/or accessing application 310 and a remote device (e.g., remote programmable logic controller (PLC)) that a user wishes to access and/or manage by the accessing application 310. In some instances, this may involve determining a request to access the particular remote device from the accessing application 310 and creating a route from the accessing device 308 to the particular remote device in response.

Baseline port and protocol usage manager 302 may then cause the forwarding of traffic from the accessing device 308 and/or the accessing application 310 to the remote device to be disabled. In various embodiments, forwarding to the particular remote device may be disabled by the accessing device 308, an intermediate device within a computer network, other devices, and/or combinations thereof.

Once forwarding is disabled, baseline port and protocol usage manager 302 may cause the collection of statistics related to the protocols and/or port connection to the remote device. The collected statistics may include, for example, port usage, protocol usage/distribution, source and destination IP address, data volume, connection frequency, and/or other port and protocol usage data that is not being initiated by the accessing application 310. While some or all the measured protocol and/or port usage may be associated with accessing device 308, they may represent and/or be characterized as background noise and/or as unrelated to the operation of the accessing application 310 since these statistics are collected while forwarding to the particular remote device is disabled and/or while the accessing application 310 is not operational. As such, these statistics may be utilized to determine a baseline reference measurement of port and protocol usage not related to the operation of accessing application 310. This baseline reference measurement may represent port and protocol usage that are not initiated by the accessing application 310, but rather through some third-party services.

Application port and protocol usage manager 304 may be configured to measure port and protocol usage by the accessing application 310 of specific ports and protocols while it attempts to connect to the particular remote device and while forwarding to that particular remote device is disabled. For example, application port and protocol usage manager 304 may initiate the accessing application after measuring the baseline of port and protocol usage of the accessing device 308. In some instances, this may include application port and protocol usage manager 304 prompting a user to start (e.g., activate, initiate, launch, enable, etc.) the accessing application 310 after measuring the baseline of port and protocol usage of the accessing device 308. In various embodiments, the accessing application 310 may be initiated automatically and/or without user involvement after measuring the baseline of port and protocol usage of the accessing device 308.

Once the accessing application 310 has been initiated, it may begin to run and/or attempt to interact with the particular remote device. However, since packet forwarding to the device is disabled to the particular remote device, communication from the accessing application 310 may not immediately and/or ultimately be provided to the particular remote device. Rather, the purpose of running the accessing application 310 at this point may primarily be to monitor application-specific port and protocol usage.

As the accessing application 310 is running, application port and protocol usage manager 304 may be configured to collect and analyze statistics of the port and protocol data that is specific to the execution of the accessing application 310. This may include the port and protocol data that is not present in the previously measured "noise" of the baseline reference measurement. For instance, application port and protocol usage manager 304 may be configured to subtract the previously measured "noise" of the baseline reference measurement from the port and protocol data collected during execution of the accessing application 310 to identify the specific port and protocols that are specific to the execution of the accessing application 310. In various embodiments, the specific ports and protocols comprise a range of ports (e.g., not necessarily single ports).

Port and protocol opening manager 306 may then cause the opening of the specific ports and protocols for operation of the accessing application 310 with forwarding enabled to the particular remote device. The specific ports and protocols being opened may be those application-specific ports and protocols whose usage was previously measured when the accessing application 310 was attempting to connect to a remote device while forwarding was disabled excluding noise from the baseline port and protocol usage measurement. Causing the opening of these ports and protocols may include asking the user for permission to allow and/or forward the ports and protocols to the device (e.g., prompting a user for acceptance of the specific ports and protocols). Alternatively, or additionally, the specific ports and protocols may be automatically allowed without explicit user prompting or permission. In addition, port and protocol opening manager 306 may cause the enablement of forwarding of traffic from the accessing device 308 to the particular remote device for operation of the accessing application 310.

Once the ports and protocols to the device have been opened or forwarded and/or traffic forwarding from the accessing device 308 to the particular remote device for operation of the accessing application 310 has been enabled per the determined network configuration, port and protocol opening manager 306 may verify the network configuration is a correct/viable one for accessing a remote device. Verifying the network configuration is correct/viable may include confirming that the accessing application 310 can properly communicate with the particular remote device using the configuration. For instance, port and protocol opening manager 306 may confirm that the accessing application 310 can connect to the particular remote device during operation with forwarding enabled to the particular remote device by performing a configuration check, connectivity test, protocol compliance check, data exchange test, error check, performance tracking, log checking, etc. independently, in concert with accessing device 308 and/or accessing application 310, in concert with intermediate devices in the computing network, etc.

If port and protocol opening manager 306 determines that the accessing application 310 is not and/or cannot properly communicate with the particular remote device, it may cause some or all of the operations described with respect to port and protocol identification process 248 to be repeated in a renewed attempt to identify specific ports and protocols for operation of the accessing application 310. Additionally, these operations may be repeated any number of times to dynamically learn the required ports and protocols for the connection.

Conversely, if port and protocol opening manager 306 determines that the accessing application 310 is or can properly communicating with the particular remote device, it may cause the learned information (e.g., the required ports and protocols for the connection) to be converted to a protocol definition for future use (e.g., for configuring future communications of the accessing device 308, for configuring future communications of the accessing application 310, for configuring future communications of deployments of the accessing application 310 on other devices, for configuring future communications of other similar accessing applications, for configuring future communications of for accessing other remote IoT devices, for incorporation in a predictive model, for incorporation in a machine learning model, etc.). Further, port and protocol opening manager 306 may be configured to remeasure the accessing application 310 for usage of additional ports and protocols to open in response to confirming that the accessing application 310 can connect to the particular remote device during operation with forwarding enabled to the particular remote device.

Likewise, while executing, port and protocol identification process 248 may cause continued measurement of the accessing application 310 usage while connected to the particular remote device with forwarding enabled to the particular remote device. During the continued measurement, port and protocol identification process 248 may be configured to detect usage of new ports and protocols by the accessing application and/or determine whether to open the new ports and protocols for operation of the accessing application 310. In various embodiments, determining whether to open the new ports and protocols may include prompting a user for acceptance of the new ports and protocols and/or opening the new ports and/or protocols based on the user's response to the prompt. Of course, the determination and/or opening may be done automatically instead.

In addition to the above-mentioned operations, network scanning and/or mapping utilities (e.g., Nmap, Zmap, Masscan, Zenmap, etc.) may be utilized to discover on which protocols and/or ports the device is listening. Identification of the protocols and/or ports discovered by port and protocol identification process 248 in combination with those discovered by network scanning and/or mapping utilities may provide smaller and/or more secure subsets of protocols and/or ports needed for a specific application to work with a device type. Likewise, some applications use ranges of ports, not single ports, and the ranges of ports found by port and protocol identification process 248 and those discovered by network scanning and/or mapping utilities may be combined.

Figure 4:
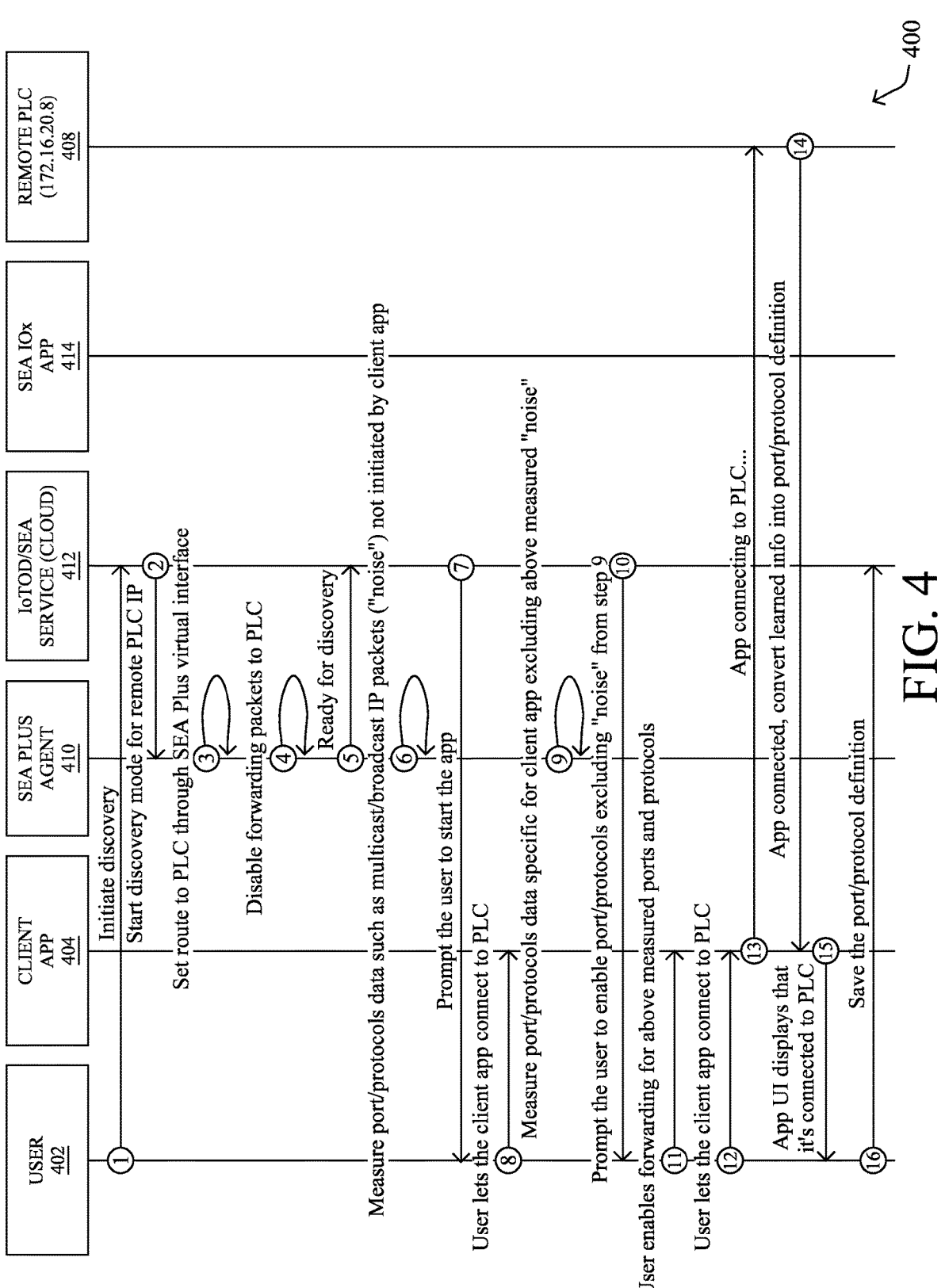
FIG. 4 illustrates an example of a sequence diagram for a use case of detection and configuration of protocol and ports for access to IoT devices.

FIG. 4 illustrates an example of a sequence diagram 400 for a use case for detection and configuration of protocol and ports for access to IoT devices, according to one or more embodiments of the disclosure. In the use case, user 402 is attempting to run a client application 404 on their device to access a remote PLC device 408. The accessing of remote PLC device 408 by client application 404 may occur through a secure equipment access utility and/or method involving a secure equipment access agent 410, a secure equipment access service 412 (e.g., cloud-based) and/or a secure equipment access application 414.

User 402 may not have prior knowledge of the ports and/or the protocols required to connect to remote PLC device 408. However, a port and protocol identification process (e.g., port and protocol identification process 248) may be performed in order to automatically detect and configure the required ports and the protocols for client application 404 to access a remote PLC device 408.

Execution of the port and protocol identification process may involve user 402 initiating discovery at step 1. At step 2, the discovery mode for remote PLC device 408 IP may be initiated with secure equipment access service 412. At step 3, the route to remote PLC device 408 may be set through a secure equipment access virtual interface. Packet forwarding to the remote PLC device 408 may be disabled at step 4, rendering the secure equipment access agent 410 ready for discovery at step 5.

At step 6, secure equipment access agent 410 may measure port and/or protocol data such as multicast/broadcast IP packets not initiated by client application 404 (e.g., "noise"). Then, at step 7, secure equipment access service 412 may prompt user 402 to start the client application 404. Once user 402 allows the client application 404 attempt to connect to the remote PLC device 408 at step 8, secure equipment access agent 410 may, at step 9, measure port and/or protocol data specific to the client application 404 excluding the "noise." At step 10, secure equipment access service 412 may prompt user 402 to enable the application-specific port and/or protocols (e.g., excluding the "noise" from step 9).

At step 11, user 402 may enable forwarding for the ports and protocols from step 10 and/or let the client application 404 attempt to connect to the remote PLC device 408 at step 12. At step 13, client application 404 may attempt connecting to the remote PLC device 408 and, at step 14, the client application 404 and remote PLC device 408 may be successfully connected and communicating at which point the learned information (e.g., the required application-specific port and/or protocols) may be converted into a port and protocol definition. At step 15, client application 404 may cause the application user interface to display to user 402 that client application 404 is connected to remote PLC device 408. User 402 may save the port and protocol definition for future use at step 16.

It should be noted that while certain steps may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while some of the steps are described as being executed or performed by specific entities or utilities (e.g., user 402, remote PLC device 408, client application 404, secure equipment access agent 410, secure equipment access service 412, a secure equipment access application 414, etc.), these are non-limiting examples and it is contemplated that the steps may be automated and/or performed by entities or utilities other than the provided examples.

Figure 5:
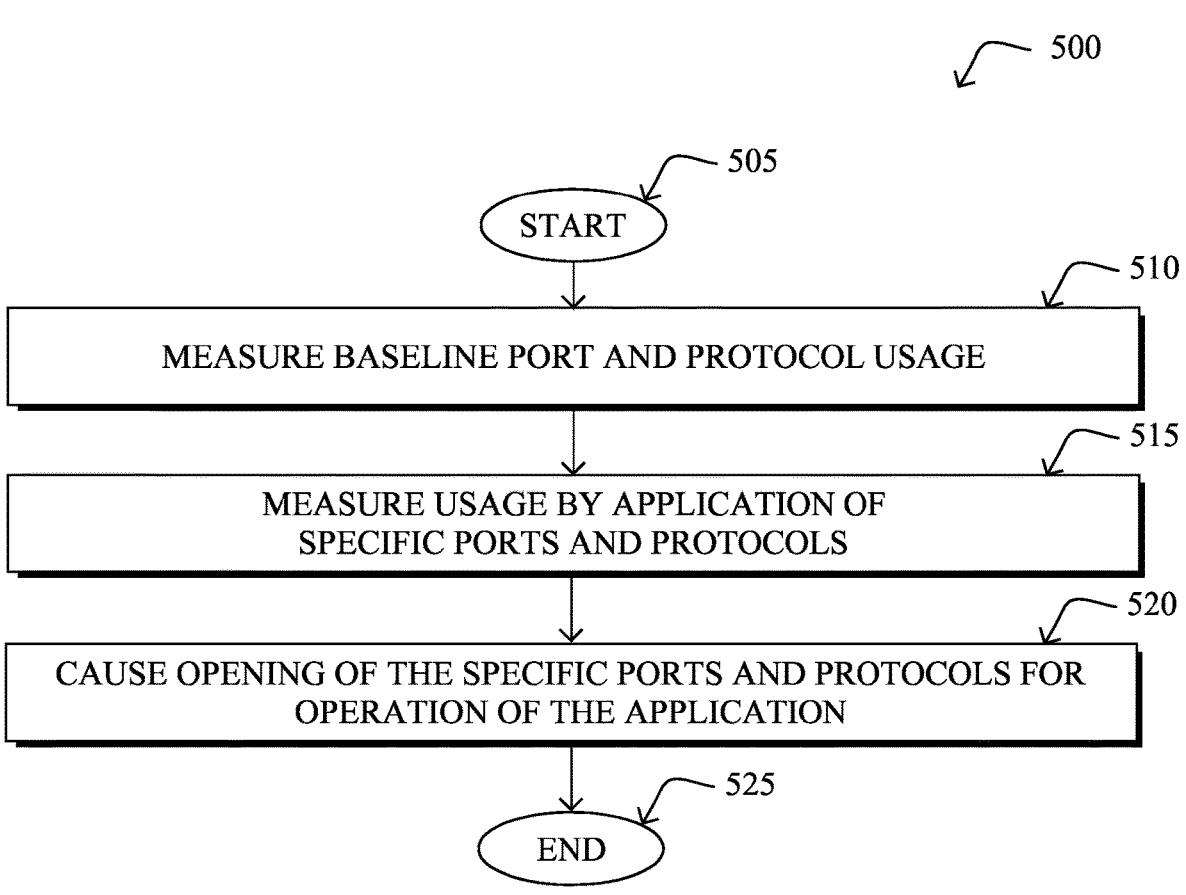
FIG. 5 illustrates an example of a procedure for detection and configuration of protocol and ports for access to IoT devices.

FIG. 5 illustrates an example simplified procedure for detection and configuration of protocol and ports for access to IoT devices in a network in accordance with one or more embodiments described herein. For example, a non-generic, specifically configured device (e.g., device 200) may perform procedure 500 by executing stored instructions (e.g., port and protocol identification process 248). The procedure 500 may start at step 505, and continues to step 510, where, as described in greater detail above, a baseline of port and protocol usage of an accessing device may be measured while forwarding to a particular remote device is disabled.

Therefore, procedure 500 may include disabling forwarding of traffic from the accessing device to the particular remote device. Forwarding to the particular remote device may be disabled by an intermediate device within a computer network. Alternatively, or additionally, forwarding to the particular remote device may be disabled by the accessing device. The particular remote device may be an internet of things device. The accessing application may be an application configured to remotely manage the particular remote device.

In various embodiments, procedure 500 may include determining a request to access the particular remote device from the accessing application. A route may be created from the accessing device to the particular remote device in response to this determination.

At step 515, usage by an accessing application of specific ports and protocols may be measured while attempting to connect to the particular remote device and while forwarding to the particular remote device is disabled. As such, forwarding of traffic from the accessing device to the particular remote device for operation of the accessing application may be enabled prior to measuring the usage by the accessing application of specific ports and protocols. In addition, the accessing application may be initiated after measuring the baseline of port and protocol usage of the accessing device. In some instances, this initiation may include prompting a user to initiate the accessing application after measuring the baseline of port and protocol usage of the accessing device.

As detailed above, at step 520, opening of the specific ports and protocols may be caused for operation of the accessing application with forwarding enabled to the particular remote device. The specific ports and protocols comprise a range of ports. In various embodiments, a user may be prompted for acceptance of the specific ports and protocols. Alternatively, the specific ports and protocols may be automatically allowed.

Further, whether the accessing application can connect to the particular remote device during operation with forwarding enabled to the particular remote device may be confirmed. In response to such a confirmation, the accessing application may be remeasured for usage of additional ports and protocols.

In various embodiments, accessing application usage may continue to be measured while connected to the particular remote device and while forwarding enabled to the particular remote device. Usage of new ports and protocols by the accessing application may be detected in the continued measurement. In such instances, whether to open the new ports and protocols for operation of the accessing application may then be determined. This determination may include prompting a user for acceptance of the new ports and protocols.

Procedure 500 then ends at step 525.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500 is described separately from sequence diagram 400, certain steps from each may be incorporated into the other, and the steps are not meant to be mutually exclusive.

The techniques described herein, therefore, facilitate automated and dynamic learning of the protocols and ports needed to support access between an IoT device and an application. Once learned, the information can be utilized to properly configure a network to support such access. The result is improved application performance, improved IoT device performance, improved network performance, decreased attack surface exposure, increased network security, among other advantages.

According to the embodiments herein, an illustrative method herein may comprise: measuring, by a process, a baseline of port and protocol usage of an accessing device while forwarding to a particular remote device is disabled; measuring, by the process, usage by an accessing application of specific ports and protocols while attempting to connect to the particular remote device while forwarding to the particular remote device is disabled; and causing, by the process, opening of the specific ports and protocols for operation of the accessing application with forwarding enabled to the particular remote device.

In one embodiment, the method further comprises disabling forwarding of traffic from the accessing device to the particular remote device. In one embodiment, the method further comprises continuing to measure accessing application usage while connected to the particular remote device while forwarding enabled to the particular remote device; detecting usage of new ports and protocols by the accessing application; and determining whether to open the new ports and protocols for operation of the accessing application. In one embodiment, determining whether to open the new ports and protocols comprises: prompting a user for acceptance of the new ports and protocols.

In one embodiment, the method further comprises confirming that the accessing application can connect to the particular remote device during operation with forwarding enabled to the particular remote device; and in response, remeasuring accessing application for usage of additional ports and protocols to open. In one embodiment, causing opening of the specific ports and protocols comprises: prompting a user for acceptance of the specific ports and protocols. In one embodiment, causing opening of the specific ports and protocols comprises: automatically allowing the specific ports and protocols by the process.

In one embodiment, the method further comprises enabling forwarding of traffic from the accessing device to the particular remote device for operation of the accessing application. In one embodiment, forwarding to the particular remote device is disabled by an intermediate device within a computer network. In one embodiment, forwarding to the particular remote device is disabled by the accessing device. In one embodiment, the method further comprises initiating the accessing application after measuring the baseline of port and protocol usage of the accessing device. In one embodiment, the method further comprises prompting a user to initiate the accessing application after measuring the baseline of port and protocol usage of the accessing device.

In one embodiment, the particular remote device is an internet of things device. In one embodiment, the method further comprises: determining a request to access the particular remote device from the accessing application; and creating a route from the accessing device to the particular remote device in response. In one embodiment, the accessing application is configured to remotely manage the particular remote device. In one embodiment, the specific ports and protocols comprise a range of ports.

According to the embodiments herein, an illustrative tangible, non-transitory, computer-readable medium having computer-executable instructions stored thereon that, when executed by a processor on a computer, cause the computer to perform a method comprising: measuring a baseline of port and protocol usage of an accessing device while forwarding to a particular remote device is disabled; measuring usage by an accessing application of specific ports and protocols while attempting to connect to the particular remote device while forwarding to the particular remote device is disabled; and causing opening of the specific ports and protocols for operation of the accessing application with forwarding enabled to the particular remote device.

According to the embodiments herein, an illustrative apparatus comprising: one or more network interfaces to communicate with a network; a processor coupled to the one or more network interfaces and configured to execute one or more processes; and a memory configured to store a process that is executable by the processor, the process, when executed, configured to: measure a baseline of port and protocol usage of an accessing device while forwarding to a particular remote device is disabled; measure usage by an accessing application of specific ports and protocols while attempting to connect to the particular remote device while forwarding to the particular remote device is disabled; and cause opening of the specific ports and protocols for operation of the accessing application with forwarding enabled to the particular remote device.

While there have been shown and described illustrative embodiments that provide for detection and configuration of protocols and ports for access to IoT devices, it is to be understood that various other adaptations and modifications may be made within the spirit and scope of the embodiments herein. For example, while certain embodiments are described herein with respect to using certain components for purposes of performing the operations associated with detection and configuration of protocols and ports for access to IoT devices, execution of these operations are not limited to such components and may be distributed among other components, in other embodiments. In addition, while certain examples involving user prompts and permissions are shown, in other examples the prompts and permission may be replaced with automation and/or other triggers, accordingly. Moreover, while IoT devices have been described as a primary implementation example, the techniques herein may be applicable to any remote device access using particular ports and protocols that are discoverable in similar manners.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
measuring, by a process, a baseline of port and protocol usage of an accessing device while forwarding to a particular remote device is disabled;
measuring, by the process, usage by an accessing application of specific ports and protocols while attempting to connect to the particular remote device while forwarding to the particular remote device is disabled, wherein the specific ports and protocols are identified by excluding the previously measured baseline of port and protocol usage of the accessing device; and
causing, by the process, opening of the specific ports and protocols for operation of the accessing application with forwarding enabled to the particular remote device.

2. The method as in claim 1, further comprising:
disabling forwarding of traffic from the accessing device to the particular remote device.

3. The method as in claim 1, further comprising:
continuing to measure accessing application usage while connected to the particular remote device while forwarding enabled to the particular remote device;
detecting usage of new ports and protocols by the accessing application; and
determining whether to open the new ports and protocols for operation of the accessing application.

4. The method as in claim 3, wherein determining whether to open the new ports and protocols comprises:
prompting a user for acceptance of the new ports and protocols.

5. The method as in claim 1, further comprising:
confirming that the accessing application can connect to the particular remote device during operation with forwarding enabled to the particular remote device; and
in response, remeasuring accessing application for usage of additional ports and protocols to open.

6. The method as in claim 1, wherein causing opening of the specific ports and protocols comprises:
prompting a user for acceptance of the specific ports and protocols.

7. The method as in claim 1, wherein causing opening of the specific ports and protocols comprises:
automatically allowing the specific ports and protocols by the process.

8. The method as in claim 1, further comprising:
enabling forwarding of traffic from the accessing device to the particular remote device for operation of the accessing application.

9. The method as in claim 1, wherein forwarding to the particular remote device is disabled by an intermediate device within a computer network.

10. The method as in claim 1, wherein forwarding to the particular remote device is disabled by the accessing device.

11. The method as in claim 1, further comprising:
initiating the accessing application after measuring the baseline of port and protocol usage of the accessing device.

12. The method as in claim 1, further comprising:
prompting a user to initiate the accessing application after measuring the baseline of port and protocol usage of the accessing device.

13. The method as in claim 1, wherein the particular remote device is an internet of things device.

14. The method as in claim 1, further comprising:
determining a request to access the particular remote device from the accessing application; and creating a route from the accessing device to the particular remote device in response.

15. The method as in claim 1, wherein the accessing application is configured to remotely manage the particular remote device.

16. The method as in claim 1, wherein the specific ports and protocols comprise a range of ports.

17. A tangible, non-transitory, computer-readable medium having computer-executable instructions stored thereon that, when executed by a processor on a computer, cause the computer to perform a method comprising:

measuring a baseline of port and protocol usage of an accessing device while forwarding to a particular remote device is disabled;

measuring usage by an accessing application of specific ports and protocols while attempting to connect to the particular remote device while forwarding to the particular remote device is disabled, wherein the specific ports and protocols are identified by excluding the previously measured baseline of port and protocol usage of the accessing device; and causing opening of the specific ports and protocols for operation of the accessing application with forwarding enabled to the particular remote device.

18. The tangible, non-transitory, computer-readable medium as in claim 17, wherein the method further comprises:

continuing to measure accessing application usage while connected to the particular remote device while forwarding enabled to the particular remote device;

detecting usage of new ports and protocols by the accessing application; and determining whether to open the new ports and protocols for operation of the accessing application.

19. The tangible, non-transitory, computer-readable medium as in claim 17, wherein the method further comprises:

confirming that the accessing application can connect to the particular remote device during operation with forwarding enabled to the particular remote device; and in response, remeasuring accessing application for usage of additional ports and protocols to open.

20. An apparatus, comprising:

one or more network interfaces to communicate with a network;

a processor coupled to the one or more network interfaces and configured to execute one or more processes;

a memory configured to store a process that is executable by the processor, the process, when executed, configured to:

measure a baseline of port and protocol usage of an accessing device while forwarding to a particular remote device is disabled;

measure usage by an accessing application of specific ports and protocols while attempting to connect to the particular remote device while forwarding to the particular remote device is disabled, wherein the specific ports and protocols are identified by excluding the previously measured baseline of port and protocol usage of the accessing device; and cause opening of the specific ports and protocols for operation of the accessing application with forwarding enabled to the particular remote device.

* * * * *